Patented Dec. 13, 1938

2,140,236

UNITED STATES PATENT OFFICE 2,140,236

PIGMENT

Ekbert Lederle, Ludwigshafen, Max Günther, Mannheim, and Rudolf Brill, Heidelberg, Germany No Drawing. Application May 15, 1937, Serial No. 142,928. In Germany March 14, 1934

10 Claims. (Cl. 134—58)

This application is a continuation in part of our copending application, Serial No. 11,164, filed March 14, 1935, for the manufacture of white pigments comprising zinc titanates.

This invention as compared to that described in Serial No. 11,164, relates generally to titanate pigments. It has special reference to the preparation of titanate pigments possessing proper particle size, clarity of color and other pigment properties which render such titanates eminently adapted for use in the manufacture of surface coating compositions and many other varied products.

Generally speaking, titanates have been prepared according to prior art methods in two ways: (a) by heating together, without fusion, a titanium-oxygen compound, e. g., titanium dioxide, and a metallic oxide, and; (b) by fusion together by means of a flux, a titanium-oxygen compound and a metallic oxide. Neither of these methods has produced titanate pigments which satisfactorily meet the requirements of modern pigment standards.

The first of the above noted prior art methods tends to yield products in which a considerable portion of the starting ingredients remains uncombined. If the temperature is unduly raised or the heating unduly prolonged with a view to obtaining a more complete combination, the products become hard, coarse and gritty and badly discolored. The second of the above noted prior art methods, while it tends toward a more complete combination, yields products which can never be pulverized to a sufficient degree of fineness, uniformity and soft, smooth texture which are required of a modern pigment. Although, in respect to chemical composition, prior art preparations may have represented titanates of various metals, such products, without exception, have proven unadaptable for use as pigments.

By means of the present invention as herein set forth metallic titanates may be prepared which possess a fineness, uniformity of particle size, clarity of color, smooth and soft texture and other pigment properties rendering them eminently suited for use as pigments.

Thus an object of our invention is an improved method for preparing titanate pigments. Another object of our invention is a method for controlling particle size and texture of titanate pigments. These and other objects of our invention will become apparent from the following description thereof.

In our aforementioned application, Serial No. 11,164, we have disclosed certain improvements in the preparation of zinc titanate pigments. These improvements, we have found, are equally adaptable to the manufacture of metallic titanates generally.

Briefly described, our invention consists of three features which considered jointly, constitute a complete process for preparation of pigmentary metallic titanates. However, each individual feature may be employed in connection with a method for preparing metallic titanates not embodying the other herein described features with a resulting improvement in the pigment properties of the metallic titanates obtained.

The first feature of the present invention may be described as the mutual precipitation of ingredients which are contained in the starting mixture, for example, reactive metallic compounds and reactive titanium compounds.

The second feature of the present invention is a calcination of the starting mixture throughout a range of increasing temperature such as is obtainable, for example, in a two-step calcination.

The third feature of the present invention is a treatment of the starting mixture or the calcined product at elevated temperatures and pressures in the presence of water which may or may not contain certain addition agents.

We have found that when one or all ingredients of the starting mixture of reactive metallic compounds and reactive titanium compounds is prepared by mutual precipitation there is obtained an extremely uniform and intimate mixture of the ingredients having a very fine particle size. Such a uniform mixture of fine particle size is highly desirable since it permits this reaction to go substantially to completion without excessive heating at elevated temperatures. Furthermore, the products resulting from such mixtures are more uniform in particle size than those obtained by prior art methods.

Thus, according to this feature of our invention, one of the ingredients in finely-divided form may be suspended in an aqueous solution of a salt of the other ingredient and both ingredients precipitated by causing the soluble ingredient to precipitate as a water-insoluble compound. For example, hydrous titanium oxide or titanium dioxide may be suspended in an aqueous solution of a salt of a metal capable of forming a titanate. The metal may then be precipitated from solution upon the addition of a reagent capable of forming a water-insoluble reactive metal compound.

By reactive metal compound we mean to include the compounds of metals, such as the oxides, hydroxides, carbonates, and other compounds which will decompose at the calcination temperatures employed to yield the oxide, and which will react with titanium at elevated temperatures to form titanates. An example of such procedure is to suspend titanium dioxide in a solution of zinc sulfate or chloride and to add thereto a solution of sodium carbonate which will precipitate a zinc carbonate and titanium dioxide in an intimate and uniform mixture of fine particle size.

By reactive titanium compounds we mean to include titanium dioxide and any titanium compounds which will decompose at the calcination temperatures employed to yield titanium dioxide.

On the other hand, according to this feature of our invention, it is possible to suspend finely-divided reactive metal compounds in solutions of titanium, such as a titanium sulfate solution and to precipitate therefrom the titanium, either hydrolytically by heating the mixture or by the addition of an alkaline neutralizing agent to precipitate ortho-titanic acid.

Alternatively, according to this same feature of our invention, it is possible to mix together aqueous solutions of salts of the ingredients which are to make up the starting mixture and to precipitate both the reactive metal compounds and the reactive titanium compound from the mixed solution. For example, we may mix together a solution of nickel sulfate and a solution of titanium sulfate and add thereto a solution of sodium hydroxide, thus precipitating nickel hydroxide and ortho-titanic acid.

Our invention is not limited to any particular metal but is applicable to the preparation of titanates of any metal which is capable of being precipitated as reactive metal compound from an aqueous solution of a water-soluble salt of the said metal. Single or mixed titanates of aluminum, barium, cadmium, calcium, cobalt, copper, iron, lead, manganese, magnesium, nickel, strontium and zinc, may be prepared from the starting mixtures obtained by the mutual precipitation metals just described. It will be understood, of course, that the metallic compound, if precipitated, must be reactive, that is to say, it must be in a form capable of yielding oxide at the calcination temperatures employed in the formation of the titanates. Such reactive forms will include, of course, the oxides and hydroxides of the metals above enumerated; it will include also the hydrocarbonates, hydrosulfides and many of the carbonates and sulfides as well.

We further found that when a starting mixture of reactive metal compounds and reactive titanium compounds is calcined throughout a range of increasing temperature, a more complete combination is obtained without imparting to the product the undesirable hardness and discoloration which results at the elevated temperature necessary to obtain substantially complete combination as employed by the prior art. Such a calcination may suitably be carried out as a two-step method wherein the starting mixture is first calcined at a comparatively low temperature and then heated at a comparatively higher temperature. By such procedure the titanate is formed substantially completely at the low temperature. The high temperature serves to develop the crystallinity of the product and to increase the particle size as desired. For example, the titanates of the above listed metals may be formed by heating the desired starting mixture at a temperature between about 500° and about 800° C., after which the temperature may be raised up to 1100° C. until the proper particle size is obtained.

As stated in our copending Serial No. 11,164, we found that an increase in particle size improves the pigment properties and that this increase in particle size can be followed by means of the X-ray. When the product has attained a particle size of about $10^{-6}$ cm. sharp interference lines begin to appear on the X-ray plate. These lines increase in sharpness as the particle size increases with corresponding improvement in the pigment properties, particularly weather-resistance and freedom from chalking. Consequently, according to this feature of our invention the titanate formation may be carried to substantial completion in one step and then the particle size controlled in the second step. This was not possible in prior art methods because at the elevated temperatures required by the prior art to substantially complete the formation of the titanate, titanate formation and growth of particle size were going on side by side during the heating. As a result prior art products varied greatly in particle size, whereas the products of the present invention are uniform and even textured.

It will be understood, of course, that it is possible, according to this feature of our invention, to prepare the titanate in a reaction vessel, such as a rotary calciner, wherein the starting mixture will enter the low temperature region and progressively move through the calciner at a rate of speed sufficient to hold the mixture within the low temperature range until titanate formation is substantially complete before passing into the higher temperature regions. Accordingly, this feature of our invention is not limited to a two-step calcination, per se, but is directed to a heat treatment by means of which the titanate formation is substantially completed before any appreciable growth of particle size occurs.

We have further discovered that the texture and the softness of the titanate pigments which may be prepared according to the present invention may be improved by subjecting the calcined product or the starting mixture to a pressure treatment at elevated temperatures in the presence of $H_2O$. Thus, a metallic titanate may be moistened with water preferably to form a slurry and heated in an autoclave to temperatures between 110° and about 500° for about 1 to about 4 hours. The resulting titanates will possess improved covering power and low oil absorption; it will also possess a smooth and soft texture. Although it is preferable to carry out this treatment on the calcined titanate, similar advantages may be obtained by subjecting the starting mixture to a pressure treatment as described. Such a treatment is particularly useful when starting mixtures are prepared by methods other than those of the present invention.

The effect of the pressure treatment may be enhanced by the addition of very small amounts of certain agents added to the water prior to the pressure treatment. Such agents include neutral salts, such as sodium sulfate, sodium chloride, magnesium sulfate, etc.; acids, such as hydrochloric acid, sulfuric acid, etc.; bases, such as sodium hydroxide, potassium hydroxide, etc., as well as protective colloids. In general, it appears that any substance capable of dissolving crystalloidally or colloidally in the water enhances the advantage accruing from the pressure treatment. The amounts of such materials may vary between 0.01% and 1.0% based on the weight of the pigment to be treated.

Having thus described our invention the following examples are given for illustrative purposes only, but it will be understood no limitations as to temperatures, proportions, time of heating, etc., are to be deduced therefrom.

*Example 1.—Illustrating (a) the precipitation of the reactive metal compound in the presence of the $TiO_2$; (b) two-step calcination; (c) pressure treatment after calcination*

One kilogram of finely-divided calcined titanium hydroxide, $TiO_2$ is suspended in about 10 liters of a calium chloride solution containing about 1260 grams $CaCl_2$ in solution (equivalent to 1 kilogram $CaCl_2$). A sufficient amount of a 20% solution of sodium carbonate is added to precipitate the calcium as $CaCO_3$. The titanium dioxide, of course, settles out of suspension with the precipitating $CaCO_3$. The resulting finely-divided and uniform mixture is heated to about 750° C. for about 2½ hours, the temperature is then raised to about 950° C. for about 1 hour. The product after cooling is pulverized and then mixed with water to form a free slurry, after which it is heated for about 2 hours in a rotating autoclave for about 2½ hours at 200° C.

The resulting calcium metatitanate is a substantially pure white pigment. It will possess a smooth, soft texture, low oil absorption and a uniform particle size.

*Example 2.—Illustrating the pressure treatment prior to calcination using addition agents*

In a variation of Example No. 1, the starting mixture of titanium dioxide and precipitated calcium compound is subjected to a pressure treatment in the presence of water containing a trace of hydrochloric acid for 3 hours at 200° C., prior to calcination.

*Example 3.—Illustrating (a) the precipitation of orthotitanic acid in the presence of reactive metal compound; (b) use of a gradually increasing temperature*

One kilogram of finely-divided zinc oxide is suspended in five kilograms of a titanium sulfate solution containing about 500 grams $TiO_2$ in solution. The $TiO_2$ is precipitated as orthotitanic acid by adding an aqueous solution of sodium hydroxide. The uniform mixture of zinc oxide and orthotitanic acid is washed and may or may not be dried, as desired. It is fed to a rotary calciner so regulated that it remains in a temperature zone between 500° and 800° C. until titanate formation is substantially complete, as determined by withdrawing a sample and testing for free ZnO by means of an ammoniacal ammonium salt solution after which it passes into a zone of higher temperature, not exceeding 950° C. until a particle size of about $10^{-6}$ cm. is obtained as determined by X-ray analysis.

The resulting zinc orthotitanate is, after pulverizing, a pure white pigment, uniform in particle size, smooth in texture and substantially free from uncombined $TiO_2$ and ZnO.

*Example 4.—Illustrating the precipitation of both titanium compound and the reactive metal compound*

Four hundred grams of magnesium oxide, MgO, is thoroughly mixed with hydrous titanium oxide containing about 900 grams of $TiO_2$, from which impurities, including the sulfate radical have been removed. The resulting mixture is dissolved in sulfuric acid to obtain a solution of magnesium and titanium sulfates. This solution is then treated with caustic alkali solution until a mixed precipitate of the titanium and magnesium constituents results. This intimate and uniform mixture will serve as an excellent starting mixture for the preparation of magnesium metatitanate $MgTiO_3$ of pigment quality.

*Example 5.—Illustrating the two-step calcination*

One mol. of finely-divided litharge, PbO, is intimately mixed with hydrolytically precipitated hydrous titanium oxide containing one mol. $TiO_2$ and some adsorbed or combined $SO_4$. This intimate mixture is first heated for about 2 hours at 600° C. for about 2 hours during which the titanate formation is substantially complete and volatile impurities are driven off. The temperature is then raised to about 800° C. for about 4 hours to develop crystallinity and growth of particle size.

The resulting lead titanate, after calcination, is slightly yellow in color. It is uniform in particle size, has a smooth, even texture and is excellently adapted for use as a pigment.

It will be understood, of course, that it is impossible to give specific examples of all metallic titanates, whether they be simple titanates of a single metal or mixed titanates of two or more metals. It will be appreciated that our invention, as herein described and illustrated, may be subjected to various modifications and variations within the skill of the operator without departing from the scope of the invention. For example, fluxes, such as alkaline metal sulfates or chlorides, borates, tungstates, and vanadates, and the like, may be employed to cut down the time of reaction, care being taken that the use of such fluxes is restricted to an amount which will not bring about a fusion of the reaction mixture.

Among the many simple titanates which may be prepared according to the present invention, are the following: white zinc titanate, blue-green iron titanate, yellow nickel titanate, green cobalt titanate, white calcium titanate, white magnesium titanate, blue-green or red manganese titanate, light yellow lead titanate, yellow to white barium titanate, white strontium titanate and white cadmium titanate. Many beautiful colored titanates may be prepared according to our invention which contain two or more metals in addition to the titanate radical, and which are regarded as "mixed titanates". For example, a beautiful blue pigment may be prepared by a calcination of a starting mixture, a reactive cobalt compound, a reactive aluminum compound and a reactive titanium compound.

The products prepared according to the present invention are useful particularly in surface coating compositions but are also generally useful wherever high quality pigments are desired. Furthermore, they may be mixed in the well-known manner with the usual extenders to form composite titanate pigments.

The foregoing description has been given for clearness of understanding and no undue limitations should be deduced therefrom, but the appended claims should be considered as broadly as possible in the light of the prior art.

We claim:

1. Process for the preparation of pigmentary metallic titanates which comprises preparing a uniform and intimate mixture of "reactive metal compounds" with "reactive titanium compounds" by mutual precipitation from aqueous media, heating the mixture so obtained at a gradually increasing temperature within the range of about 500° C. to about 1100° C., the temperature being maintained first within the range of about 500° C. to about 800° C. until the formation of titanate is substantially complete and being thereafter maintained within the range of about 800° C. to about 1100° C. until the product exhibits sharp interference lines on an X-ray photograph mixing the calcined product with water and then heating the mixture under pressure at an elevated temperature.

2. Process for the preparation of pigmentary metallic titanates which comprises preparing a uniform and intimate mixture of "reactive metal compounds" and "reactive titanium compounds" by mutual precipitation from aqueous media, and heating the mixture so obtained at a temperature within the range of about 500° C. to about 800° C. until titanate formation is substantially complete and then heating the titanate at a higher temperature within the range of about 800° C. to about 1100° C. until the heated products exhibit sharp interference lines on an X-ray photograph.

3. In a method for preparing pigmentary metallic titanates which includes the thermal combination of reactive metal compounds with "reactive titanium compounds", the step which consists in heating an intimate and uniform mixture of "reactive metal compounds" with "reactive titanium compounds" at a gradually increasing temperature within the range of about 500° C. to about 1100° C., the temperature being maintained first within the range of about 500° C. to about 800° C. until the formation of titanate is substantially complete and being thereafter maintained within the range of about 800° C. to about 1100° C. until the product exhibits sharp interference lines on an X-ray photograph.

4. In a method of preparing pigmentary metallic titanates which includes the thermal combination of reactive metal compounds with "reactive titanium compounds", the steps which consist in heating an intimate and uniform mixture of "reactive metal compounds" with "reactive titanium compounds" within the range from about 500° C. to about 1100° C., the temperature being maintained in a first stage at between about 500° C. and about 800° C. until titanate formation is substantially complete and being thereafter maintained at a higher temperature than in the first stage not exceeding about 1100° C. until the heated product exhibits sharp interference lines on an X-ray photograph.

5. In a method for preparing pigmentary metallic titanates which includes the thermal combination of "reactive metal compounds" with "reactive titanium compounds", the step which consists in heating an intimate and uniform mixture of "reactive metal compounds" with "reactive titanium compounds" at a gradually increasing temperature within the range of about 500° C. to about 1100° C., the temperature being maintained first within the range of about 500° C. to about 800° C. until the formation of titanate is substantially complete and being thereafter maintained within the range of about 800° C. to about 1100° C. until the product exhibits sharp interference lines on an X-ray photograph in the presence of a small amount of a flux.

6. In a method for preparing metallic titanates which consists in heating a starting mixture of "reactive metal compounds" and "reactive titanium compounds", the step which consists in subjecting the starting mixture prior to heating to a pressure treatment at an elevated temperature in the presence of $H_2O$.

7. In a method for preparing metallic titanates which consists in heating a starting mixture of "reactive metal compounds" and "reactive titanium compounds", the step which consists in subjecting the titanate obtained after heating to a pressure treatment at an elevated temperature in the presence of $H_2O$.

8. In a method for preparing metallic titanates which consists in heating a starting mixture of "reactive metal compounds" and "reactive titanium compounds", the step which consists in subjecting the starting mixture prior to heating to a pressure treatment at an elevated temperature in the presence of $H_2O$ containing a small amount of an added soluble substance selected from the group consisting of acids, bases and salts.

9. In a method for preparing metallic titanates which consists in heating a starting mixture of "reactive metal compounds" and "reactive titanium compounds", the step which consists in subjecting the titanate obtained after heating to a pressure treatment at an elevated temperature in the presence of $H_2O$ containing a small amount of an added soluble substance selected from the group consisting of acids, bases and salts.

10. In a method of preparing pigmentary magnesium titanate which includes the thermal combination of a "reactive magnesium compound" with a "reactive titanium compound" the step which consists in first heating an intimate and uniform mixture of a "reactive magnesium compound" with a "reactive titanium compound" at a temperature within the range of about 500° C. to about 800° C. until formation of magnesium titanate is substantially complete and then heating the magnesium titanate at a higher temperature within the range of about 800 to about 1100° C. until the magnesium titanate exhibits sharp interference lines on an X-ray photograph.

EKBERT LEDERLE.
MAX GÜNTHER.
RUDOLF BRILL.